Dec. 28, 1937.  A. S. HOWELL  2,103,369
STRIP FEED MECHANISM
Filed Oct. 22, 1934  3 Sheets-Sheet 1
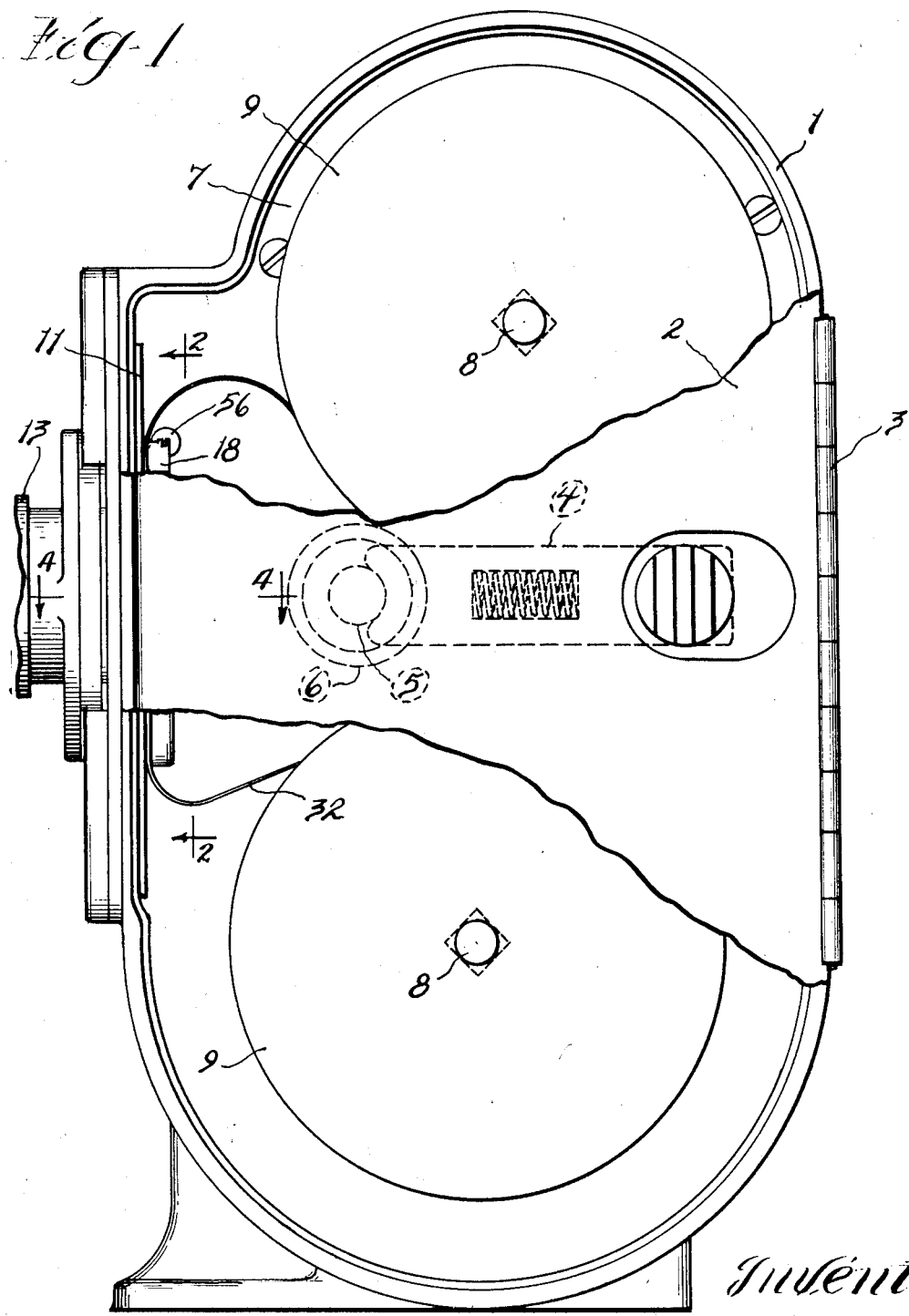
Inventor,
Albert S. Howell,
By Robert F. Miller
Atty.

Dec. 28, 1937.　　　　　A. S. HOWELL　　　　　2,103,369
STRIP FEED MECHANISM
Filed Oct. 22, 1934　　　　3 Sheets—Sheet 2
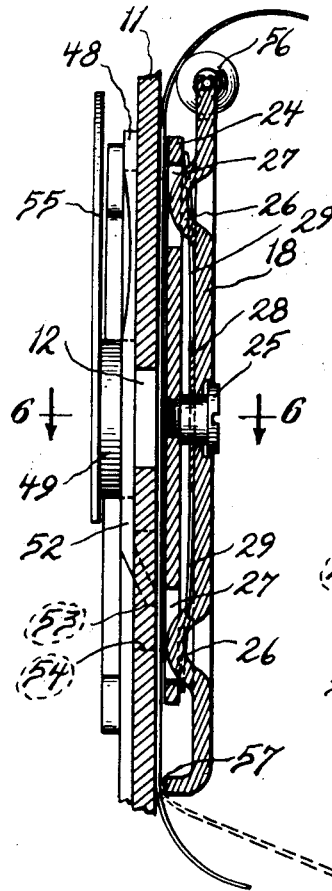
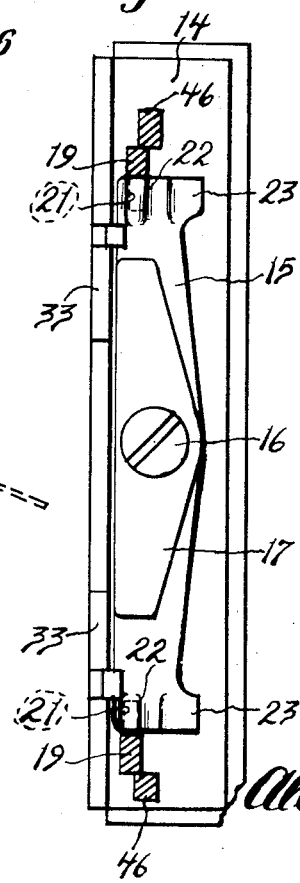
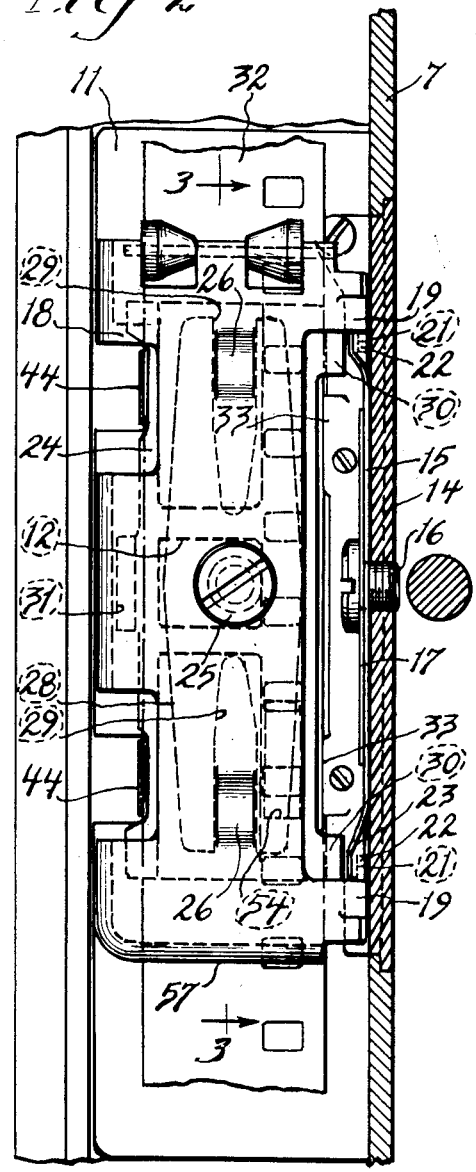
Inventor:
Albert S. Howell.
By: Robert T. Mickle
Atty.

Dec. 28, 1937.  A. S. HOWELL  2,103,369
STRIP FEED MECHANISM
Filed Oct. 22, 1934   3 Sheets-Sheet 3
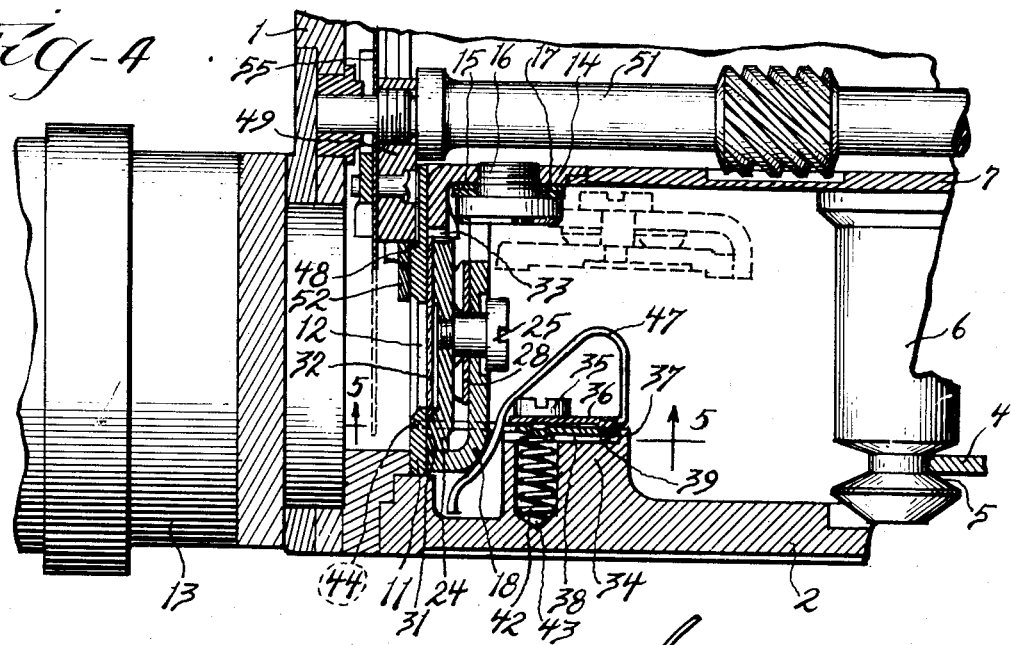
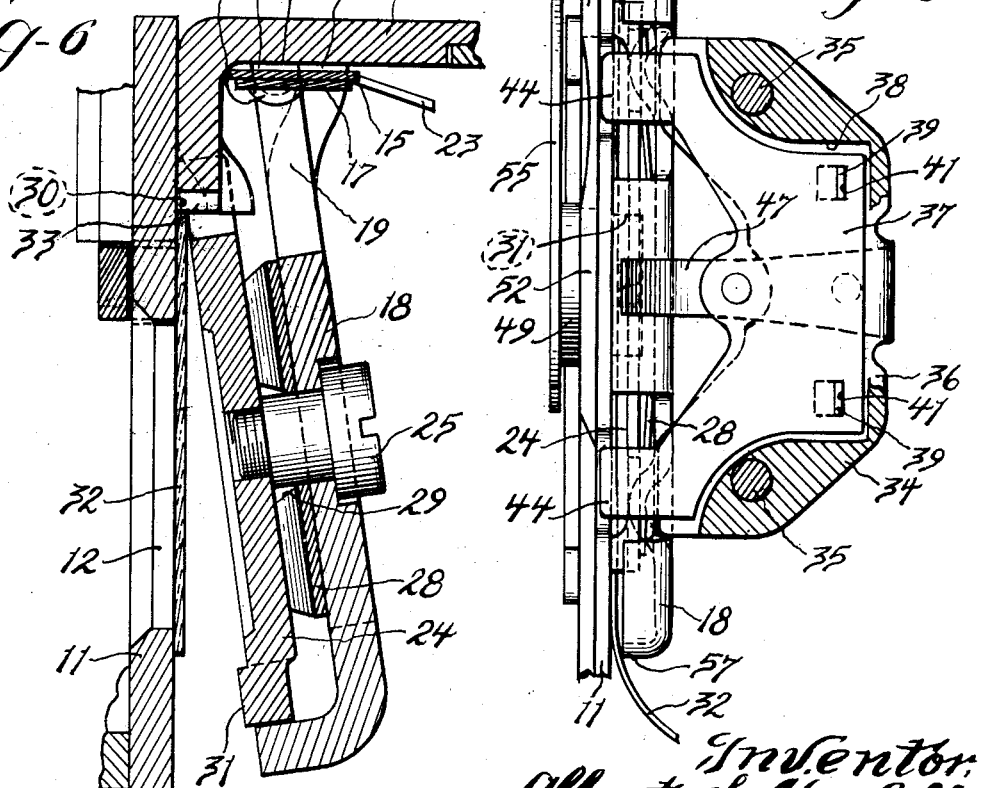
Inventor:
Albert S. Howell.
By: Robert F. Miehle
Atty.

Patented Dec. 28, 1937

2,103,369

UNITED STATES PATENT OFFICE 2,103,369

STRIP FEED MECHANISM

Albert S. Howell, Chicago, Ill., assignor to The Bell & Howell Company, Chicago, Ill., a corporation of Illinois Application October 22, 1934, Serial No. 749,334

15 Claims. (Cl. 88—17)

My invention relates particularly to perforated motion picture strip feed mechanism for motion picture cameras although not restricted to this use alone.

One of the objects of the invention resides in the provision of a novel and effective strip feed guide, particularly an intermittent film feed exposure guide for a motion picture camera, with a view toward proper guidance of the strip or film and the convenient lacing of the strip or film in the guide.

Another object of the invention resides in the provision of a novel and effective strip controlling means in combination with a strip feed means and a take up means and operative upon the strip to prevent the take up means from disturbing the feed of the strip by the feed means, particularly with reference to an intermittent strip feed means and the maintenance of the registry of the strip as fed thereby.

With these objects in view my invention consists in certain features of novelty in the construction, combination and arrangement of parts by which the said objects and certain other objects, hereinafter appearing, are effected, all as fully described with reference to the accompanying drawings and more particularly pointed out in the appended claims.

In the said drawings—

Figure 1 is a side elevation of a motion picture camera embodying my invention and having portions of the access door thereof broken away;

Figure 2 is a partial sectional view on the line 2—2 of Figure 1;

Figure 3 is a partial section on the line 3—3 of Figure 2;

Figure 4 is a partial section on the line 4—4 of Figure 1;

Figure 5 is a partial sectional view on the line 5—5 of Figure 4; and

Figure 6 is an enlarged partial section on the line 4—4 of Figure 1 showing parts of the device in a different position from that in which they are shown in Figure 4.

Figure 7 is a partial interior view in elevation similar to Figure 1 with a part shown in section.

Referring to the drawings, I designates an enclosing casing of a motion picture camera, which casing is open at one side to provide an access opening, and a door 2 is hinged, as designated at 3, to the rear portion of the casing for movement into and out of position closing the open side of the casing, the door being locked in closed position by means of a releasable latch device, generally designated at 4, and engaging a groove 5 on the outer end portion of a stud 6 secured to and projecting outwardly from an intermediate partition plate 7 fixed within the casing in parallelism with the open side of the casing. See Figures 1 and 4.

The portion of the interior of the casing 1 between the open side thereof and the plate 7 forms the film chamber of the camera, and two vertically spaced revoluble film reel spindles 8 project outwardly from the plate 7 and have film reels 9 within the film chamber detachably mounted thereon, the lower spindle 8 being, as usual, frictionally driven from the mechanism of the camera and angularly fixed with the lower film reel to take up a film from the intermittent film feed exposure guide of the camera, now to be described.

Arranged within the casing 1 at the intermediate front portion of the aforesaid film chamber is the intermittent film feed exposure guide of the camera, which extends vertically or correspondingly with the plane of the open side of the casing and which is disposed in a plane transverse to the plane of the open side of the casing, this guide consisting as follows.

A vertically extending, transversely disposed plate 11 is fixed within the casing 1 and, forming the intermediate portion of the front wall of the film chamber, constitutes the front face guide member of the intermittent film feed exposure guide, the plate 11 being provided with an intermediate exposure aperture 12 which is alined with a photographic lens 13 mounted on the front of the casing 1.

An angle member 14 extends vertically within the casing 1 and has one leg thereof engaged forwardly against the plate 11 and has its other leg projecting rearwardly in the plane of the plate 7 and continuing the same forwardly. A vertically extending flat spring member 15 is secured at the middle thereof against the rearwardly projecting leg of the angle member 14 by means of a headed screw 16, a strengthening leaf spring 17 being interposed between the head of this screw and the spring member 15. See Figures 4 and 7.

A vertically extending carrier member 18 of generally flat form is provided at one side thereof with vertically spaced projections 19 which are provided with spindles 21 projecting toward each other, and these spindles are disposed between the rearwardly projecting leg of the angle member 14 and the ends of the spring member 15 which are provided with recess formations 22 engaging the spindles 21 to form a pivotal mounting for the carrier member disposed on an axis extending longitudinally of the intermittent film feed exposure guide and in the region of the inner side of the guide which side is remote from the open side of the casing 1. See Figures 2, 6 and 7.

The carrier member is thus mounted for pivotal movement from a position adjacent and parallel to the front face guide member 11, as shown in Figure 4, to an inner position remote from the open side of the casing and substantially at a right angle to the guide member 11, as shown in dash lines in Figure 4, the carrier member being conveniently removable in an intermediate position of its pivotal movement, as shown in Figure 6, by springing the ends of the spring 15 outwardly and moving the carrier member rearwardly, the ends of the spring 15 being provided with rearwardly and outwardly projecting guide portions 23, see Figures 6 and 7, to facilitate the engagement of the spindles 21 under the spring ends for the convenient mounting of the carrier member.

A vertically extending plate 24 is mounted on the front of the carrier member 18 by means of a centrally disposed shouldered and headed screw 25 passing through an aperture in the member 18 and screw-threaded into the plate 24, the plate 24 having limited facewise and universal rocking movement with reference to the member 18 and being restricted from turning on the axis of the screw 25 by means of vertically spaced forwardly extruded projections 26 on the member 18 engaging apertures 27 in the plate 24 adjacent to the ends thereof. See Figures 2, 3 and 6.

A flat spring 28 is disposed between the member 18 and the plate 24 and is secured by means of the screw 25 passing through an intermediate aperture therein, the ends of this spring being bifurcated, as designated at 29, and embracing the projections 26 to prevent angular movement of the spring on the axis of the screw. See Figures 2 and 3.

The inner edge of the rear face guide plate 24 is provided with a pair of longitudinally spaced forwardly extending contact projections 30 and the outer edge of this plate is provided with an intermediate forwardly extending contact projection 31, and these contact projections engage against the rear face of the front face guide member 11, when the member 18 and the plate 24 are in their forward film guiding position, and cooperate with the spring 28 for definitely positioning the movable guide member 24 with respect to the front guide member 11 to accommodate a film 32 extending vertically through the guide between the face guide members 11 and 24. See Figures 2, 6, and 7.

The transverse leg of the angle member 14 is provided with a pair of vertically spaced projections 33 which are engaged by the inner edge of the film in the guide at spaced points therealong.

The door 2 is provided with an inward projection 34 adjacent its forward end, and secured on this projection by means of headed screws 35, is a plate 36, and another plate 37 is disposed in a recess 38 on the inner face of the projection 34 and is positioned therein for limited facewise movement by means of projections 39 struck from the plate 36 and engaging in apertures 41 in the plate 37. A coiled compression spring 42 is arranged in a bore 43 in the projection 34 and yieldably urges the plate 37 inwardly. See Figure 4 and 5.

The plate 37 is provided at its forward portion with a pair of vertically spaced forwardly projecting portions 44 which, when the door is closed, engage against the outer edge of the film 32 at spaced points therealong and engage the inner edge of the film against the projections 33 for guiding the film edgewise in the guide, it being observed that the projections 33 and portions 49 afford substantially point contact with the edges of the film and thereby afford a stable edge guide therefor.

The spindles 21 of the carrier member 18 are flattened, as designated at 45, see Figure 6, so that the spring member 15 urges and normally maintains the carrier member 18 together with the rear face guide plate 24 in an intermediate position of the pivotal movement thereof, the projections 19 being provided with rearwardly projecting stop portions 46 engageable with the rearwardly projecting leg of the angle member 14 in the intermediate position of the carrier member 18.

The plate 36 is provided at its intermediate rear portion with an extension arm 47 which is turned forwardly and outwardly toward the door 2 and which serves to move the carrier member 18 and the guide plate 24 from the aforesaid intermediate position thereof to the forward or film guide position thereof as the door is closed, the member 18 and plate 24 being thus positioned in the forward or film guiding position thereof when the door is in closed position. See Figure 4. Closure of the door also moves the edge guide portions 44 into film guiding position.

When the door 2 is opened, the spring 15 moves the carrier member 18 and the guide plate 24 to the intermediate position thereof, thus opening the guide for lacing, and the edge guide portions 44 are moved away from their guiding position, thus moving the same out of the way for lacing.

Accordingly, the lacing of the film in the intermittent film feed guide is quite convenient in that the opening and closing of the door controls the opening and closing of the guide, the film being easily inserted in the guide by reason of the angular relation of the rear face guide plate 24, in the intermediate or lacing position thereof, with the front face guide member 11.

Further, the extreme rearward position of the carrier member 18 and rear face guide plate 24 affords convenient cleaning of the guide, the carrier member 18 and guide plate 24 being conveniently removed and inserted as above described.

The film 32 is intermittently fed downwardly through the exposure guide by means of a vertically reciprocable shuttle 48 actuated by a cam 49 fixed on a rearwardly and forwardly extending driven shaft 51 within the casing, the shuttle being provided with a downwardly extending spring arm 52 provided with a ratchet tooth 53 at its lower end, which engages perforations in the film in the guide through a slot 54 in the front face guide plate 11. See Figures 2, 3, 4 and 6.

A segmental light shutter 55 is secured on the shaft 51 which serves to intermittently cut off the exposure light in timed relation with the intermittent feed of the film in the usual manner.

The film is fed to the top of the guide from the upper reel 9 and is taken up on the lower reel 9 which is frictionally driven from the mechanism of the camera in the usual manner, and rotatable rollers 56 are mounted on the upper end of the carrier member 18 for guiding the film into the upper end of the guide.

As shown, the film is frictionally engaged in the intermittent film feed exposure guide by the guide portions 44 of the plate 37 being spring pressed against the outer edge of the film and pressing the same against the opposing edge guide projections 33 of the member 14.

In order that the tension exerted upon the film by the frictionally driven take up or lower reel 9 shall not interfere with the registry of the film in the guide the following is provided.

The lower end of the carrier member 18 is turned forwardly, as designated at 57, so that it lies closely adjacent the front face guide member 11 and forms therewith a narrow passage through which the film passes between the guide and the lower or take up reel 9.

The arrangement is such that tension exerted upon the film by the take up reel causes the film to take a relatively sharp bend over the end 57, as indicated in dash lines in Figure 3, and consequent frictional resistance on the strip between the end 57 and the front face guide member 11 to prevent the driven taken up reel from moving the film in the guide.

As the film is fed in the guide the aforesaid tension is released and the aforesaid relatively sharp bend in the film is converted into one of relatively large radius, as shown in Figures 1, 3 and 5, thus releasing the aforesaid resistance incident to the sharp bend of the film over the end 57.

Having thus described my invention, I do not wish to be limited to the precise details described as changes may be readily made without departing from the spirit of my invention, but having thus described my invention, I claim as new and desire to secure by Letters Patent the following:

1. In a strip feed guide the combination of opposing strip face guide members, a pivotal mounting for one of said guide members and comprising flattened bearing means and spring means cooperating with said bearing means to yieldably urge this guide member into an intermediate position of its pivotal movement and adapted to permit movement thereof in either direction from said intermediate position, and releasable means for positioning said pivotally mounted guide member in film retaining relation with the other guide member.

2. In a strip feed guide the combination of opposing strip face guide members, a pivotal mounting for one of said guide members and comprising flattened bearing means and flat spring means provided with a cooperating recessed bearing formation maintaining said flattened bearing means in engagement and cooperating therewith to yieldably urge this guide member into an intermediate position of its pivotal movement and adapted to permit removal and installation of said this guide member, and releasable means for positioning said pivotally mounted guide member in strip guiding relation with the other guide member.

3. In a strip feed guide the combination of opposing strip face guide members, a pivotal mounting for one of said guide members comprising spaced alined bearing spindles mounted on this guide member and projecting toward each other and oppositely facing bearing elements confining said spindles, and one of which bearing elements consists of an intermediately anchored spring plate.

4. In a strip feed guide the combination of opposing strip face guide members, a pivotal mounting for one of said guide members comprising spaced alined and flattened bearing spindles fixed on this guide member and projecting toward each other and oppositely facing bearing elements confining said spindles, and one of which bearing elements consists of an intermediately anchored spring plate adapted to cooperate with said flattened bearing spindles to yieldably urge said pivotally mounted guide member into one position of its movement.

5. In a strip feed guide the combination of opposing strip face guide members, a pivotal mounting for one of said guide members comprising spaced alined and flattened bearing spindles fixed on this guide member and projecting toward each other and oppositely facing bearing elements confining said spindles, and one of which bearing elements consists of an intermediately anchored spring plate provided with recessed bearing formations engaging said spindles, said spring plate being adapted to cooperate with said flattened spindles to yieldably urge said pivotally mounted guide member into an intermediate position of its movement and adapted to permit installation and removal of this guide member, and releasable means for positioning said pivotally mounted guide member in strip guiding relation with the other guide member.

6. In a strip feed mechanism the combination with an intermittent strip feed guide comprising a relatively stationary strip face guide member and an opposing movable face guide member, of a carrier mounted for movement facewise of said stationary guide member, means resiliently carrying said movable guide member on said carrier for limited facewise movement with respect thereto, releasable means for positioning said carrier member with said movable guide member in guiding relation with said stationary guide member, a take up device for taking up a strip from said guide, and opposing strip locking members between which the strip passes between the guide and said take up device to cause a relatively sharp bend in the strip consequent to tension exerted on the strip by said take up device, one of said locking members being arranged on said carrier beyond one end of said movable guide member for movement to and away from the other locking member with movement of said carrier to open and close said guide.

7. A structure as in claim 6 in which the other of said strip locking members is formed by a portion of said relatively stationary guide member extended beyond said end of said movable guide member.

8. In a photographic camera the combination with a casing provided with an access opening and a door for closing said opening, of a film feed exposure guide within said casing and extending correspondingly with the plane of said opening and disposed in a plane transverse thereto and comprising opposing film face guide members, a pivotal mounting carrying the rear face guide member for movement into and out of film guiding position and disposed on an axis extending longitudinally of the guide and disposed in the region of the side of said guide remote from said opening, and means under the control of said door and operative to position said rear guide member rearwardly and substantially spaced from its guiding position for insertion of a film in said guide with opening of said door and to position said rear guide member in film guiding position with closure of said door.

9. In a photographic camera the combination with a casing provided with an access opening and a door for closing said opening, of a film feed exposure guide within said casing and extending correspondingly with the plane of said opening and disposed in a plane transverse thereto and comprising opposing film face guide members, a pivotal mounting carrying the rear face guide member for movement into and out of film guiding position and disposed on an axis extending longitudinally of the guide and disposed in the region of the side of said guide remote from said opening, spring means yieldably urging said rear face guide member rearwardly into a position substantially spaced from its guiding position for insertion of a film in said guide, and means under the control of said door and operative to position said rear guide member in film guiding position with closure of said door.

10. In a photographic camera the combination with a casing provided with an access opening and a door for closing said opening, of a film feed exposure guide within said casing and comprising opposing film face guide members and opposing film edge guide members, and mounting means carrying one of said face guide members and one of said edge guide members for movement into and out of film guiding position comprising a mounting carrying said movable edge guide member on said door.

11. In a photographic camera the combination with a casing provided with an access opening and a door for closing said opening, of a film feed exposure guide within said casing and comprising opposing film face guide members and opposing film edge guide members, a mounting carrying one of said face guide members for movement into and out of film guiding position, a second mounting carrying one of said edge guide members on said door for movement therewith into film guiding position with closure of said door, and means operative to position said movable guide member in film guiding position with closure of said door.

12. In a photographic camera the combination with a casing provided with an access opening and a door for closing said opening, of a film feed exposure guide within said casing and extending correspondingly with the plane of said opening and disposed in a plane transverse thereto and comprising opposing face guide members and opposing film edge guide members, a pivotal mounting carrying the rear face guide member for movement into and out of film guiding position and disposed on an axis extending longitudinally of the guide and in the region of the side of the guide remote from said opening, a second mounting carrying the edge guide member adjacent said opening on said door for movement therewith into film guiding position with closure of said door and means under the control of said door and operative to position said rear face guide member in film guiding position with closure of said door and to position said rear face guide member in a position rearward of its film guiding position with opening of said door.

13. In an intermittent strip feed guide the combination with a relatively stationary face guide member and an opposing movable face guide member, of a carrier mounted for movement facewise of said stationary guide member, mounting means carrying said movable guide member on said carrier for movement therewith and for limited facewise movement with respect thereto, spring means yieldably urging said movable guide member with respect to said carrier in the direction of said stationary guide member, and abutment means engageable independently of a film between said guide members and cooperating with said spring means for predeterminately positioning said movable guide member with respect to said stationary guide member when said carrier is positioned adjacent said stationary guide member.

14. In an intermittent strip feed guide the combination with a relatively stationary face guide member and an opposing movable face guide member, a carrier mounted for movement facewise of said stationary guide member, mounting means carrying said movable guide member on said carrier for movement therewith and for limited facewise movement with respect thereto, spring means yieldably urging said movable guide member with respect to said carrier in the direction of said stationary guide member, and at least three spaced abutment projections arranged in an area circumscribing relation and engageable independently of a film between said guide members and cooperating with said spring means for predeterminately positioning said movable guide member with respect to said stationary guide member when said carrier is positioned adjacent said stationary guide member.

15. In a strip guide the combination of opposing strip face guide members, two substantially rigid substantially point contact edge guide members spaced longitudinally of said face guide members and engageable with one edge of a strip disposed between said face guide members and affording spaced contacts with said edge, a spring member provided with substantially point contact edge guide portions spaced longitudinally of said face guide members and engageable with the other edge of the strip in opposition to said first mentioned edge guide members and affording spaced contacts with said other edge, and a mounting for said spring member disposed intermediate said guide portions and adapted to spring press said edge guide portions against the corresponding edge of the strip.

ALBERT S. HOWELL.